United States Patent
Hattori et al.

(10) Patent No.: US 6,412,964 B2
(45) Date of Patent: Jul. 2, 2002

(54) MIRROR ASSEMBLY FOR VEHICLE

(75) Inventors: Yasunori Hattori; Hiroki Iwasa, both of Aichi-ken; Yoshihiro Fujikawa, Toyota; Masayuki Noda, Okazaki, all of (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/825,360

(22) Filed: Apr. 4, 2001

(30) Foreign Application Priority Data

Apr. 14, 2000 (JP) .......................................... 2000-113679

(51) Int. Cl.⁷ .............................................. G02B 7/182
(52) U.S. Cl. .................. 359/879; 359/880; 359/871; 359/872
(58) Field of Search ................................. 359/879, 880, 359/871, 872, 877, 838, 850, 841, 843; 248/479, 549, 476, 480

(56) References Cited

U.S. PATENT DOCUMENTS

| | | | | |
|---|---|---|---|---|
| 4,084,886 A | * | 4/1978 | Grosch et al. | 350/281 |
| 5,566,029 A | * | 10/1996 | Zebold | 359/872 |
| 5,831,779 A | * | 11/1998 | Moore | 359/841 |
| 5,940,230 A | * | 8/1999 | Crandall | 359/841 |
| 6,310,738 B1 | * | 10/2001 | Chu | 359/883 |

* cited by examiner

Primary Examiner—Mohammad Sikder
(74) Attorney, Agent, or Firm—Nixon Peabody LLP; Thomas W. Cole

(57) ABSTRACT

A door mirror structure is provided which can improve assembly workability of a door mirror. A cord is pulled out from a base end portion of a door mirror body. In an overhanging portion of a door mirror base, a slot is formed in place of a conventional cord insertion hole. Therefore, at a door mirror assembly line, the cord can easily be inserted into the slot from an arrow A direction. As a result, the assembly workability of the door mirror can be improved.

16 Claims, 9 Drawing Sheets

MIRROR ASSEMBLY FOR VEHICLE

BACKGROUND OF THE INVENTION

1. Field of the Invention

The present invention relates to a mirror assembly for a vehicle.

1. Description of the Related Art

In FIG. 8 and FIG. 9, a conventional, general door mirror 100 is shown. As illustrated in these drawings, the door mirror 100 is formed by a door mirror body 104 having a rear-view mirror 102; a door mirror base 106 which supports a base end portion 104A side of the door mirror body 104 and is used as a seat surface for mounting to a side door of a vehicle; and a cover 108 which covers a surface of the door mirror base 106.

In the door mirror 100 having the above-described structure, a cord 110 is pulled out from the base end portion 104A of the door mirror base 104. This cord 110 is provided, for example, for supplying electricity to electrical equipment (for example, a mirror angle adjusting mechanism, a lighting system or the like) which is disposed within the door mirror body 104.

With the above-described conventional door mirror 100, a cord insertion hole 114 which is a circular hole is formed in an overhanging portion 112 of the door mirror base 106 and the cord 110 is inserted therethrough. In a door mirror assembly line for the conventional door mirror 100, the cord 110 is inserted into the cord insertion hole 114, and thereafter, assembly work such as assembling the door mirror base 106 is performed. However, a certain amount of skill is required to insert the cord 110, which has an outer diameter which is equivalent to that of the cord insertion hole 114, into the cord insertion hole 114, which is a circular hole, in a short period of time which is determined in terms of the line process, and to further perform subsequent assembly work. Therefore, there is room for improvement with respect to this point of the conventional door mirror structure.

SUMMARY OF THE INVENTION

In view of the facts described above, an object of the present invention is to provide a door mirror structure in which assembly workability of a door mirror is improved.

In order to solve the above-described problem, a mirror assembly for a vehicle relating to the present invention comprises: a base adapted for mounting to a vehicle body; and a mirror body which includes a cable extending from the mirror body, and which is mountable to the base, wherein the base includes a slot having an end which is open such that the cable maybe introduced into the slot through the slot open end.

Another mirror assembly for a vehicle relating to the present invention comprises: a base adapted for mounting to a vehicle body; and a mirror body which includes a cable extending from the mirror body, and which is pivotably connected to the base, wherein the base includes a slot having an open end such that the cable may be introduced into the slot through the slot open end, when the mirror body is connected to the base.

Another aspect of the present invention is a method for assembling a mirror assembly for a vehicle which includes: a base for mounting to a vehicle body, the base including a slot having an open end; and a mirror body which includes a cable extending from the base, the method comprising the steps of: (i) translating the cable from the outside of the slot to an inner portion of the slot through the slot open end; and (ii) mounting the mirror body to the base.

DESCRIPTION OF THE PREFERRED EMBODIMENTS

First Embodiment

Hereinafter, a description of a retractable door mirror 10 relating to an embodiment of the present invention will be given with reference to FIGS. 1 and 2.

Figure 1:
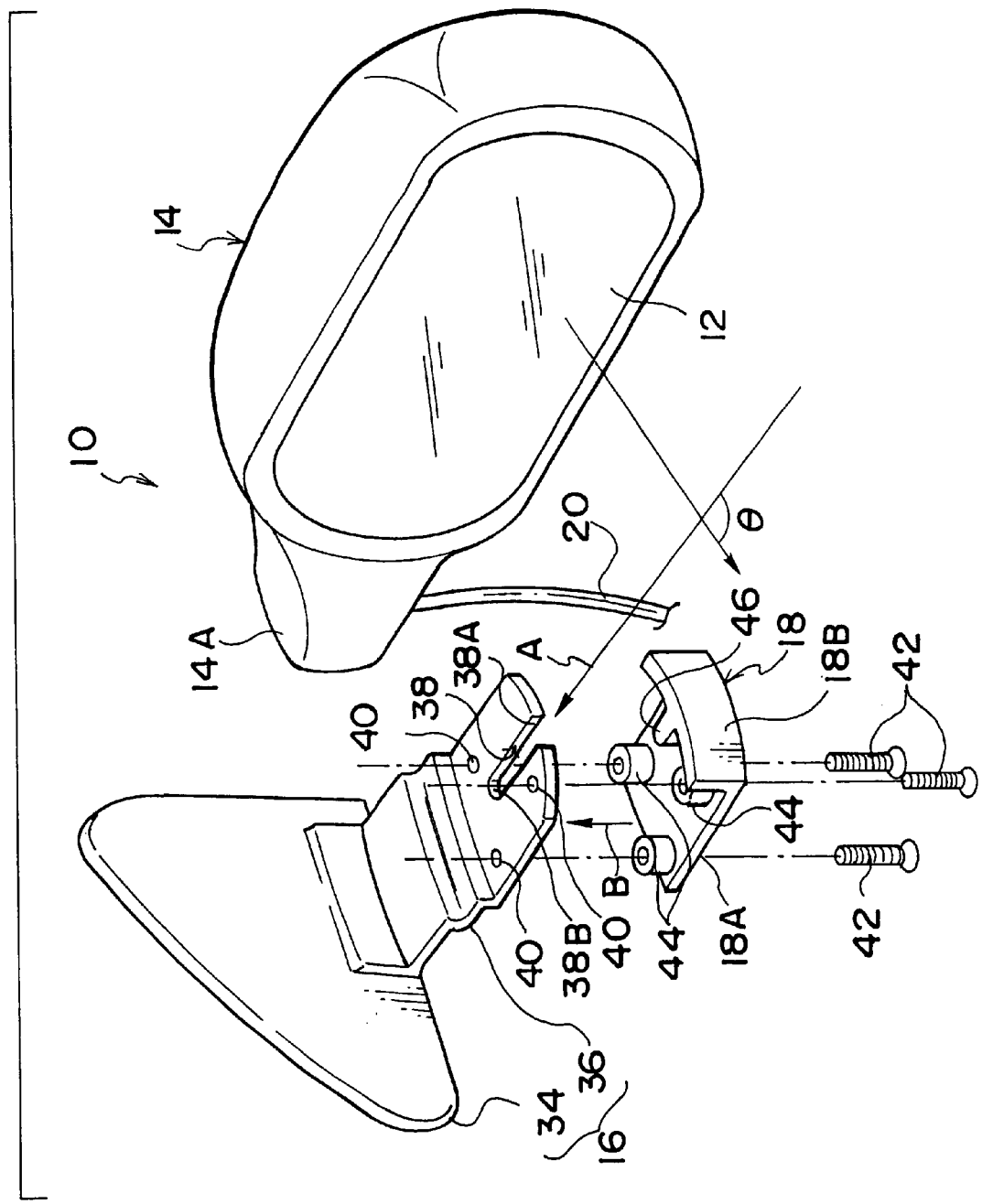
FIG. 1 is an exploded perspective view of a retractable door mirror relating to a first embodiment of the present invention.
Figure 2:
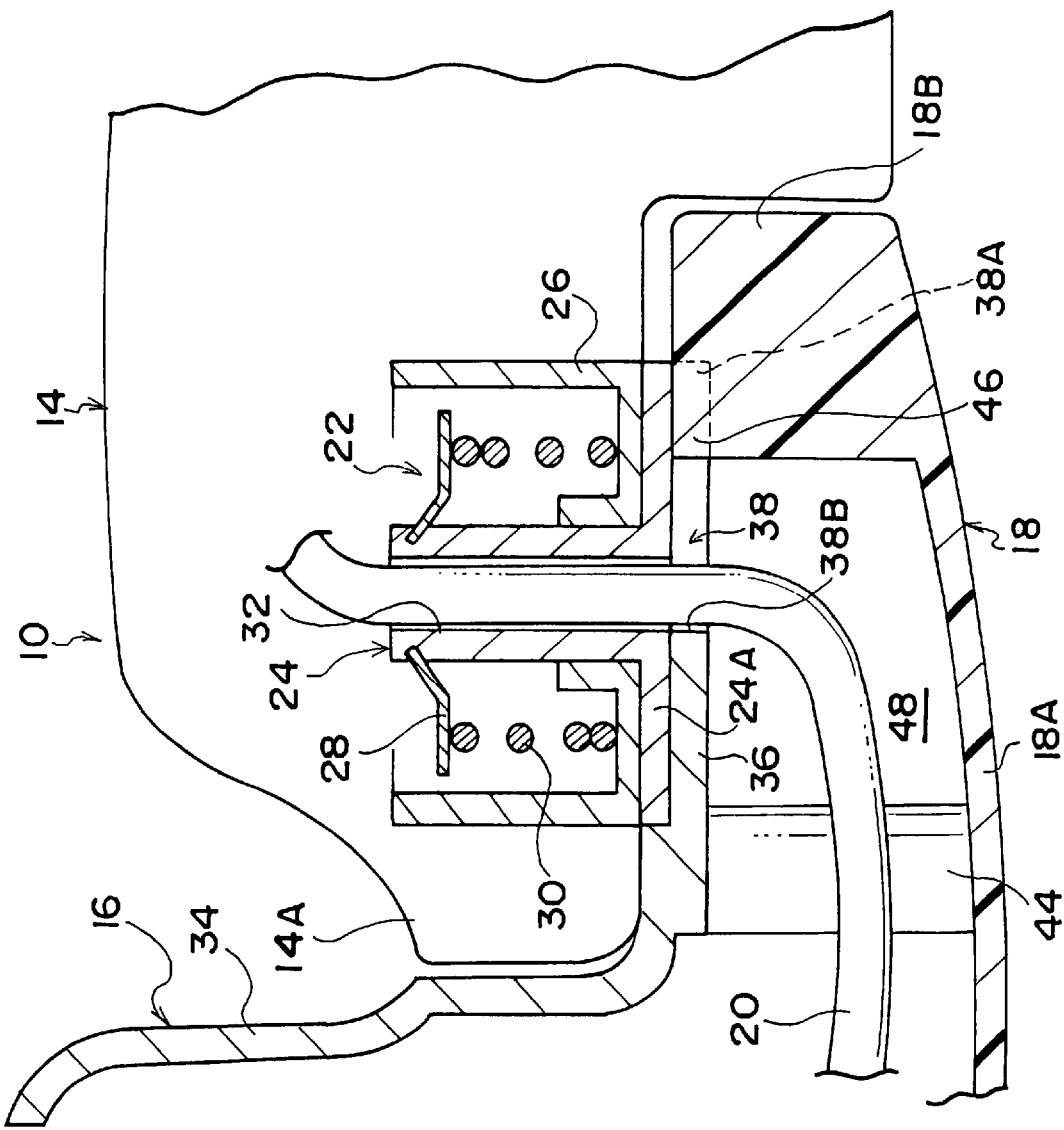
FIG. 2 is a vertical cross-sectional view of the door mirror shown in FIG. 1 in a state in which the door mirror has been assembled.

FIG. 1 is an exploded perspective view of the retractable door mirror 10 relating to the first embodiment of the present invention, and FIG. 2 is a vertical cross-sectional view of the door mirror 10 which is in an assembled state. As shown in these drawings, the door mirror 10 is formed by a door mirror body 14 which holds a rear-view mirror (mirror body) 12; a door mirror base 16 which rotatably supports a base end portion 14A of the door mirror body 14; and a cover 18 which is fitted to the door mirror base 16 from a lower side of the door mirror base 16.

Further, among the above-described components, the door mirror base 16 and the cover 18 correspond to the "door mirror base portion" in the present invention. In other words, the "door mirror base portion" is divided into two components in the present embodiment.

A cord 20 is pulled out from the base end portion 14A side of the door mirror body 14. This cord 20 is formed, for example, by wire-harnessing wires for supply electricity for a mirror angle adjusting apparatus, a foot area lighting system or the like which is disposed within the door mirror body 14.

Further, a pivot section 22, which is the center of rotation of the door mirror 10 at the time of retraction/extension of the door mirror 10, is provided at the base end portion 14A side of the door mirror body 14. The pivot section 22 is formed by a pivot shaft 24 which is fixed on an overhanging portion 36 of the door mirror base 16 which will be described later, a pivot housing 26 which has a bottom and a cylindrical shape and is fitted with the pivot shaft 24 by insertion in such a manner that the pivot housing 26 is movable in an axial direction of the pivot shaft 24, a spring sheet 28 which is fixed to an outer circumference of an upper end portion of the pivot shaft 24, and a compression coil spring 30 disposed between the spring sheet 28 and the bottom portion of the pivot housing 26 so as to surround the pivot shaft 24.

A cord insertion hole 32 is formed at an axially central portion of the pivot shaft 24, and the cord 20 is inserted through this cord insertion hole 32.

The door mirror base 16 is made of a metal and formed by a base mounting portion 34 which is formed in a substantially triangular shape when seen from a side of the vehicle, and the overhanging portion 36 which extends outwardly in the vehicle transverse direction from a lower edge side of the base mounting portion 34. The base mounting portion 34 is fixed to a corner portion of a vehicle side door by unillustrated fixing members such as bolts and nuts. Moreover, as described above, the "door mirror base portion" in the present first embodiment is formed by the two-piece structure of the door mirror base 16 and the cover 18. The "door mirror base portion" of the present invention, therefore, does not use a cover as a separate part which covers an outer surface of the base mounting portion 34. Thus, a processing such as coating with resin or painting is carried out at a predetermined range of a surface (an exposed surface which can be seen from the outside of a vehicle) of the base mounting portion 34.

Here, in the overhanging portion 36 of the door mirror base 16, a slot 38 having a straight configuration is formed. This slot 38 is formed such that the longitudinal direction thereof corresponds to the transverse direction of the vehicle, and an opening end portion 38A thereof faces toward the vehicle transverse direction outer side. In addition, at three regions at the periphery of the slot 38, screw insert-through holes 40 are formed for fixing the bottom portion 24A of the pivot shaft 24 to the overhanging portion 36.

Further, the cover 18, which is made of resin and whose configuration in plan view is substantially rectangular and similar to the configuration of the overhanging portion 36, is mounted to an under surface side of the overhanging portion 36 of the door mirror base 16. The vertical cross-section of the cover 18 along the vehicle transverse direction is substantially L-shaped. The cover 18 is provided with a bottom wall portion 18A and a vertical wall portion 18B. Cylindrical bosses 44 through which screws 42 are inserted are formed at predetermined positions (positions that are coaxial with the screw insert-through holes 40 formed in the overhanging portion 36) of the bottom wall portion 18A. The screws 42 are inserted into the cylindrical bosses 44 and the screw insert-through holes 40 from below the bottom wall portion 18A, and are screwed into a bottom portion 24A of the above-described pivot shaft 24. The cover 18 and the door mirror body 14 are thus fastened to the overhanging portion 36 of the door mirror base 16.

Moreover, a projection 46 (which is, in a broader sense, a "slot closing portion"), which protrudes toward a closed end portion 38B side of the above-described slot 38, is formed at a central portion of the vertical wall portion 18B. The thickness of this projection 46 is set to be slightly thinner than a slot width of the slot 38. In a state in which the cover 18 is mounted to the under surface of the overhanging portion 36, the projection 46 is fitted into the opening end portion 38A of the slot 38. The slot 38, therefore, is closed by the projection 46 of the cover 18. Further, in a state in which the cover 18 is mounted to the under surface of the overhanging portion 36, a predetermined gap 48 is formed between the bottom wall portion 18A of the cover 18 and the overhanging portion 36 of the door mirror base 16. The above-described cord 20 is disposed by using this gap 48.

Next, operations and effects of the present embodiment will be described.

The door mirror 10 relating to the present first embodiment is assembled as described below at an assembly line for assembly thereof.

As illustrated in FIG. 1, in a semi-assembled state of the door mirror body 14, the cord 20 is pulled out downwardly from the base end portion 14A of the door mirror body 14. In this state, first, the cord 20 is inserted from the opening end portion 38A of the slot 38 of the door mirror base 16 with the direction of arrow A in FIG. 1 being the assembling direction. This work, i.e., the work for inserting the cord 20 into the slot 38, is extremely easy and operation can be carried out in an extremely short time, compared with the conventional work (i.e., the work for inserting the cord into the cord insertion hole).

Next, the cover 18 is mounted to the under surface side of the overhanging portion 36 of the door mirror base 16 with the arrow B direction in FIG. 1 being the assembling direction. Specifically, the screws 42 are inserted into the bosses 44 formed on the bottom wall portion 18A of the cover 18 and the screw insert-through holes 40 formed in the overhanging portion 36, and are further screwed into the base end portion 14A side of the door mirror body 14. In this way, the door mirror body 14 and the cover 18 are fastened to the overhanging portion 36 of the door mirror base 16. The door mirror body 14 is rotatably supported around the pivot shaft 24, and the cover 18 is mounted to the under surface side of the overhanging portion 36 of the door mirror base 16.

At this time, the slot 38 is closed by the projection 46 formed at the cover 18 being fit into the opening end portion 38A of the slot 38. In this way, the cord 20 is prevented from being removed from the slot 38. At the same time, the predetermined gap 48 is formed between the bottom wall portion 18A of the cover 18 and the overhanging portion 36 of the door mirror base 16, and the cord 20 is disposed by utilizing this gap 48. The assembly work of the door mirror 10 is completed by the above operations. The door mirror 10 is then subsequently mounted to the corner portion of a vehicle side door.

As described above, in the first embodiment of the present invention, the slot 38 is formed, in place of the conventional cord insertion hole, in the overhanging portion 36 of the door mirror base 16. Therefore, the cord 20 which has been pulled out from the door mirror body 14 is easily inserted into the slot 38 from the opening end portion 38A side of the slot 38. Namely, in accordance with the present embodiment, the work for inserting a cord into a cord insertion hole (a circular hole), which has conventionally been performed and is complicated, can be eliminated. As a result, assembly workability of the door mirror 10 can be improved.

Further, in the present embodiment, the door mirror base portion is formed by two components, the door mirror base 16 and the cover 18. The projection 46 is formed on the cover 18, and the opening end portion 38A of the slot 38 is closed by the projection 46 when the cover 18 is mounted to the overhanging portion 36 of the door mirror base 16. Therefore, the cord 20 can be prevented from being removed from the slot 38. As a result, in accordance with the present first embodiment, the mounted state of the cord 20 can be stabilized.

Further, in the present embodiment, the opening end portion 38A of the slot 38 is directed in a direction which is other than toward a vehicle front side. Specifically, the opening end portion 38A is directed toward the vehicle transverse direction outer side. Therefore, it is difficult for air to flow into the slot 38 when the vehicle is travelling (forward) at high speed. As a result, in accordance with the present embodiment, the noise of cutting the wind when the vehicle is travelling (forward) at high speed can be prevented.

Note that the arrow A direction is the assembling direction as described above, and that the assembling direction is almost the opposite of "the direction in which the slot is opened (as defined in claims)". An angle designated by θ in FIG. 1 is approximately 90 degrees. In accordance with the present invention, it is preferable that the angle θ is about 90 degrees or less. This also holds for embodiments which will be described hereinafter.

Second Embodiment

Figure 3:
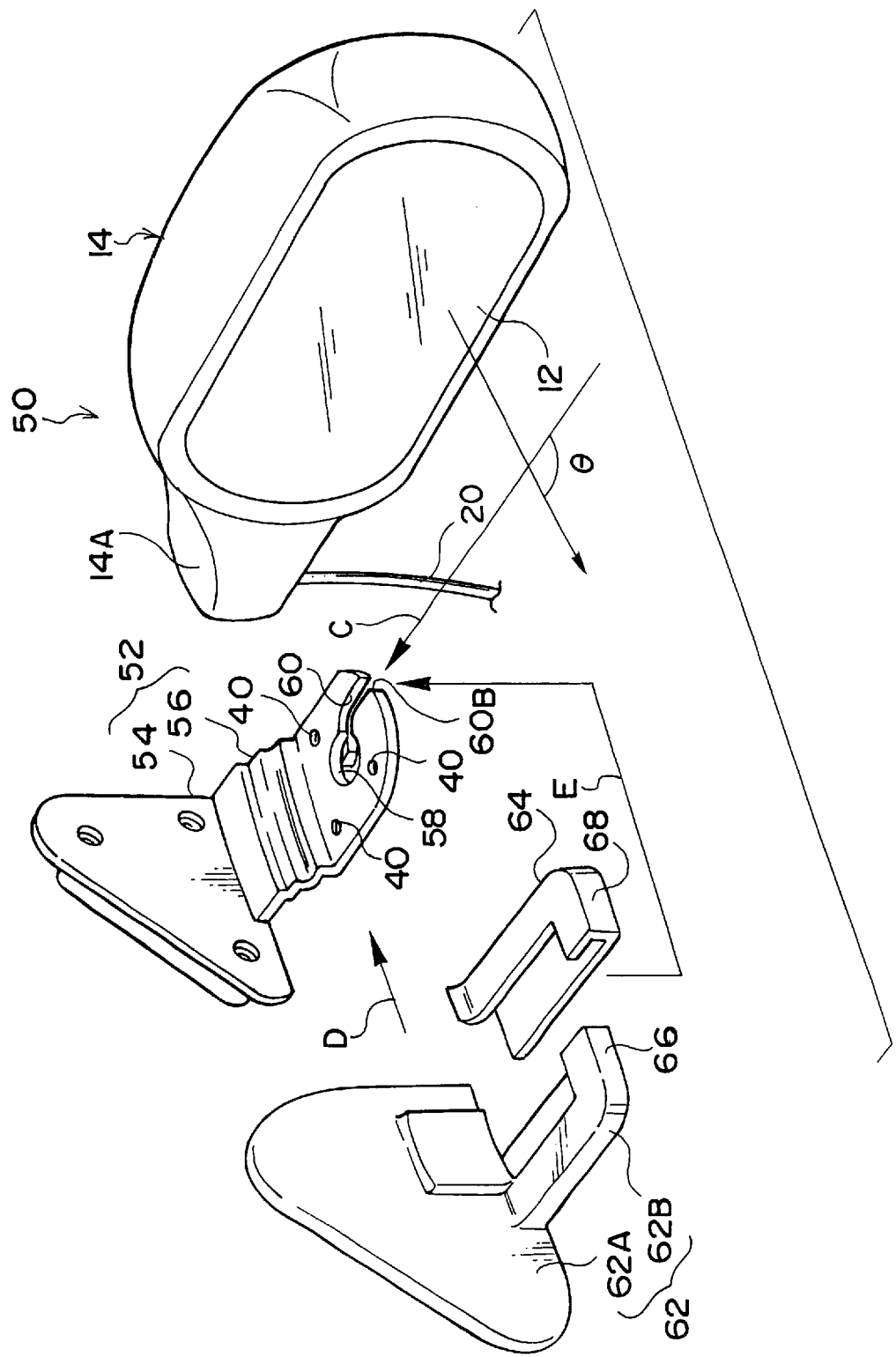
FIG. 3 is an exploded perspective view of a retractable door mirror relating to a second embodiment of the present invention.
Figure 4:
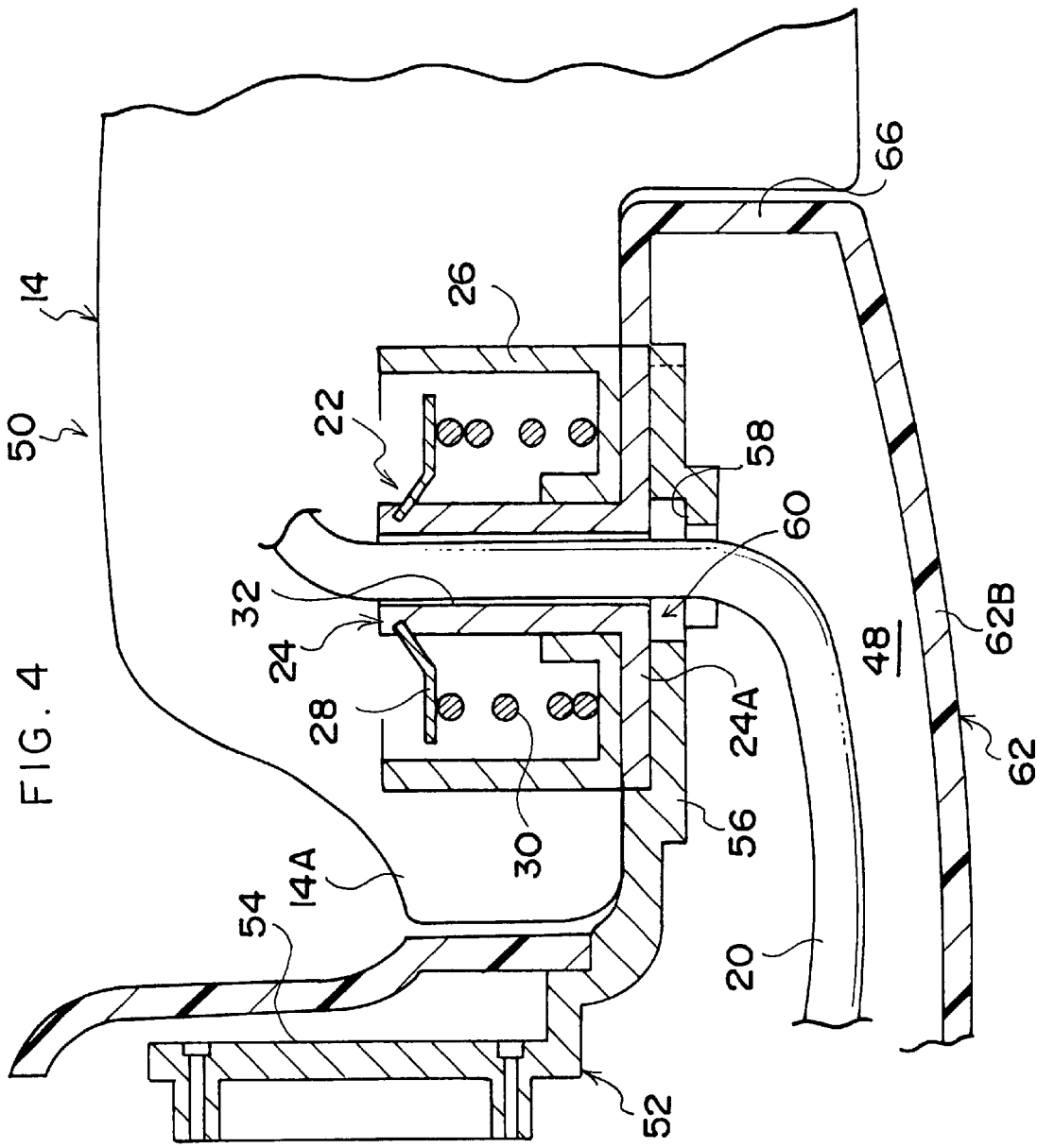
FIG. 4 is a vertical cross-sectional view of the door mirror shown in FIG. 3 in a state in which the door mirror has been assembled.
Figure 5:
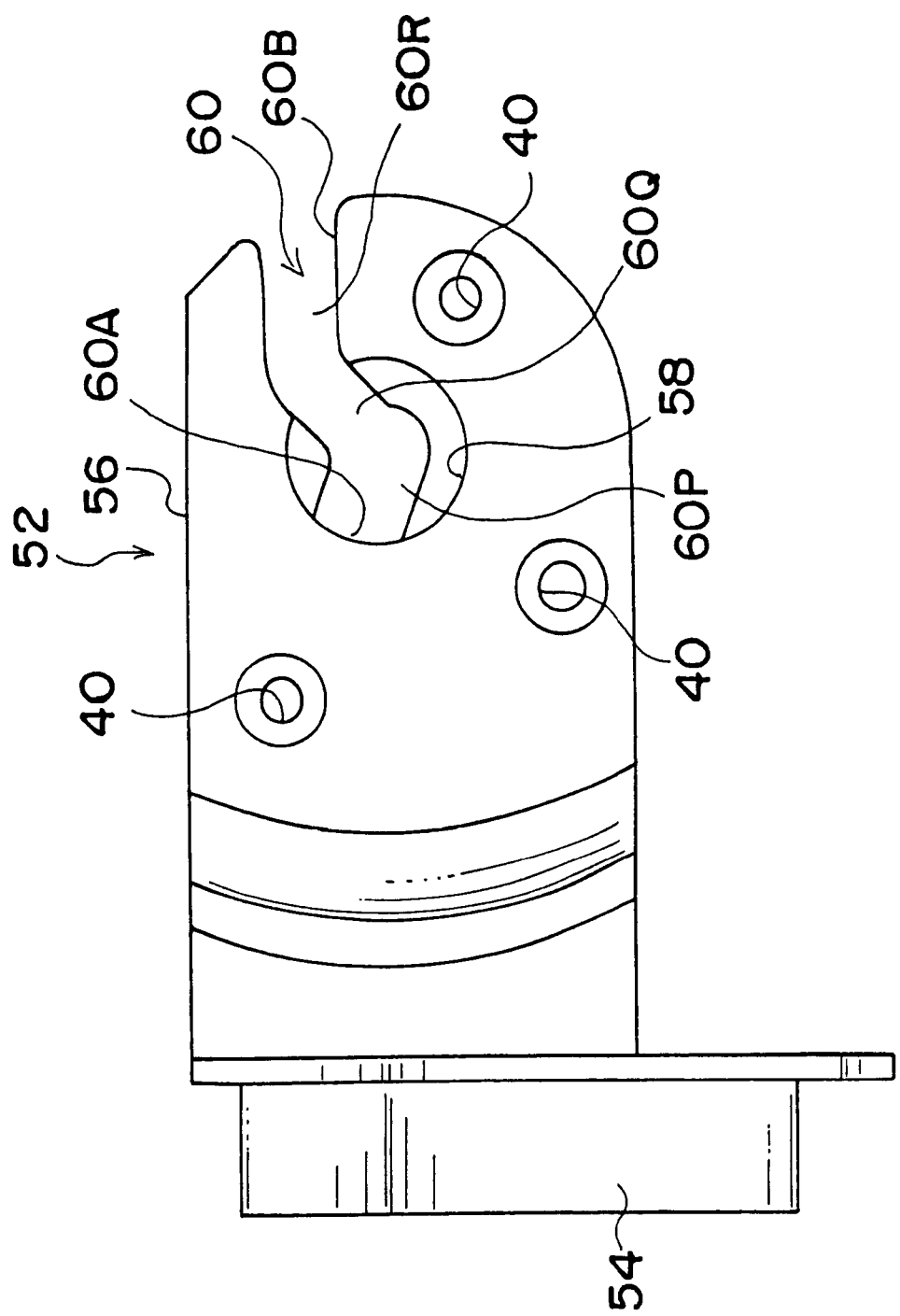
FIG. 5 is a plan view of a door mirror base shown in FIG. 3.

Next, with reference to FIGS. 3 through 5, description will be given of a retractable door mirror 50 relating to a second embodiment of the present invention. Structural portions that are the same as those described in the first embodiment are denoted by the same reference numerals, and description thereof will be omitted.

As shown in these drawings, the second embodiment of the present invention is characterized by the point that a slot is formed in a shape of a crank and the point that the "door mirror base portion" is divided into three parts.

More concretely, a door mirror base 52 in the present embodiment is formed in a manner similar to the door mirror base 16 of the above-described first embodiment in that the door mirror base 52 of the present embodiment comprises a base mounting portion 54 and an overhanging portion 56. However, as shown in FIG. 5, a concave portion 58 which is circular in a plan view is formed approximately in center of the overhanging portion 56, and a closed end portion 60A of a crank-shaped slot 60 is positioned at an inner circumferential side of the concave portion 58. The slot 60 extends linearly and approximately toward the vehicle rear side from the closed end portion 60A up to the center of the concave portion 58. At the center of the concave portion 58, the slot 60 curves and extends linearly therefrom approximately toward the vehicle front side. Further, at the position where the slot 60 has passed beyond the concave portion 58, the slot 60 curves once again and extends linearly therefrom toward the vehicle transverse direction outer side. Hereinafter, these three parts of the slot 60 are referred to as an "inner slot 60P", a "middle slot 60Q", and an "outer slot 60R", in the order in which they were described above.

Further, in the present embodiment, the door mirror base portion is formed by three components which are the door mirror base 52 made of metal and, a first cover 62 and a second cover 64 each made of resin. The first cover 62 is formed by a substantially triangular cover base portion 62A which covers the base mounting portion 54 of the door mirror base 52, and a cover overhanging portion 62B which projects from a lower edge side of the cover base portion 62A toward the vehicle transverse direction outer side and covers a rear portion of the overhanging portion 56 of the door mirror base 52. A lower end portion of the cover base portion 62A and a front end portion of the cover overhanging portion 62B are opened to be fitted on the overhanging portion 56 of the door mirror base 52 from the vehicle rear side. Moreover, an outer periphery of the rear portion of the cover overhanging portion 62B is formed to have a substantially U-shaped cross-section.

On the other hand, the second cover 64 is formed solely by a portion which covers the front portion of the overhanging portion 56 of the door mirror base 52. The outer periphery of a front portion of this second cover 64 is also formed to have a substantially U-shaped cross-section. Moreover, after the cord 20 is inserted into the slot 60 with the arrow C direction in FIG. 3 being the assembling direction, when the first cover 62 and the second cover 64 are both fitted onto the overhanging portion 56 of the door mirror base 52 with the directions of arrow D and arrow E in FIG. 3 being assembling directions of the respective covers 62 and 64, opposing end surfaces of upstanding portions 66 and 68 of the first cover 62 and the second cover 64 are connected to each other.

With the second embodiment of the present invention formed as described above, the slot 60 is formed in the overhanging portion 56 of the door mirror base 52 so that the cord 20 which has been pulled out from the door mirror body 14 can easily be inserted from the opening end portion 60B side of the slot 60, as in the above-described first embodiment. Assembly workability of the door mirror 50 can thus be improved in the second embodiment of the present invention as well.

Further, in the present embodiment as well, the opening end portion 60B of the slot 60 is directed toward a direction other than the vehicle front side (specifically, is directed toward the vehicle transverse direction outer side). Therefore, generation of the noise of cutting the wind when the vehicle is travelling (forward) at high speed can be prevented.

Further, in the present embodiment, the slot 60 formed in the overhanging portion 56 of the door mirror base 52 is formed in a crank shape. Therefore, a width of free movement of the cord 20 (i.e., the width over which the cord 20 can freely move due to vibrations of the vehicle body, retraction/extension movements of the door mirror 50 or the like) is smaller than in a case in which the straight slot 38 is formed in the overhanging portion 36 of the door mirror base 16. Namely, in order for the cord 20 which has been inserted through the inner slot 60P to move to the outer slot 60R, the cord 20 must move through the middle slot 60Q, and movement of the cord 20 toward the vehicle transverse direction outer side is restricted at this time. In addition, in the present embodiment, due to the first cover 62 and the second cover 64 being fitted onto the door mirror base 52, the opposing end surfaces of the upstanding portions 66 and 68 are connected to each other, and the opening end portion 60B of the slot 60 is closed. From these facts, in accordance with the first embodiment of the present invention, the cord 20 can reliably be prevented from being removed from the slot 60. Accordingly, the assembled state of the cord 20 can be further stabilized.

Third Embodiment

Next, with reference to FIG. 6, a description will be given of a retractable door mirror 70 relating to a third embodiment of the present invention. Structural portions that are the same as those described in the first embodiment and the second embodiment are denoted by the same reference numerals, and description thereof will be omitted.

As shown in this drawing, the present embodiment is characterized in that a way in which the "door mirror base portion" is divided into three components has been changed.

Concretely, a first cover 72 in the present embodiment is formed by a substantially triangular cover base portion 72A which covers the base mounting portion 54 of the door mirror base 52, and a cover overhanging portion 72B which extends in a frame shape from a lower edge side of the cover base portion 72A toward the vehicle transverse direction outer side and covers the overhanging portion 56 of the door mirror base 52. The outer peripheral portion of the cover overhanging portion 72B also serves as an upstanding portion 73 having a substantially U-shaped cross-section. Further, a cut-out 76 having a rectangular shape is formed in a bottom face of the cover overhanging portion 72B of the first cover 72.

A second cover 78 having a rectangular plate shape when seen in a plan view is mounted from below to the cut-out 76 of the first cover 72. Namely, four elastically deformable anchor claws 80 are provided upright at a peripheral portion of the second cover 78. The anchor claws 80 are elastically anchored to a peripheral portion of the rectangular-shaped cut-out 76, when the second cover 78 is pushed into the bottom face of the cover overhanging portion 72B of the first cover 72 from below.

Figure 6:
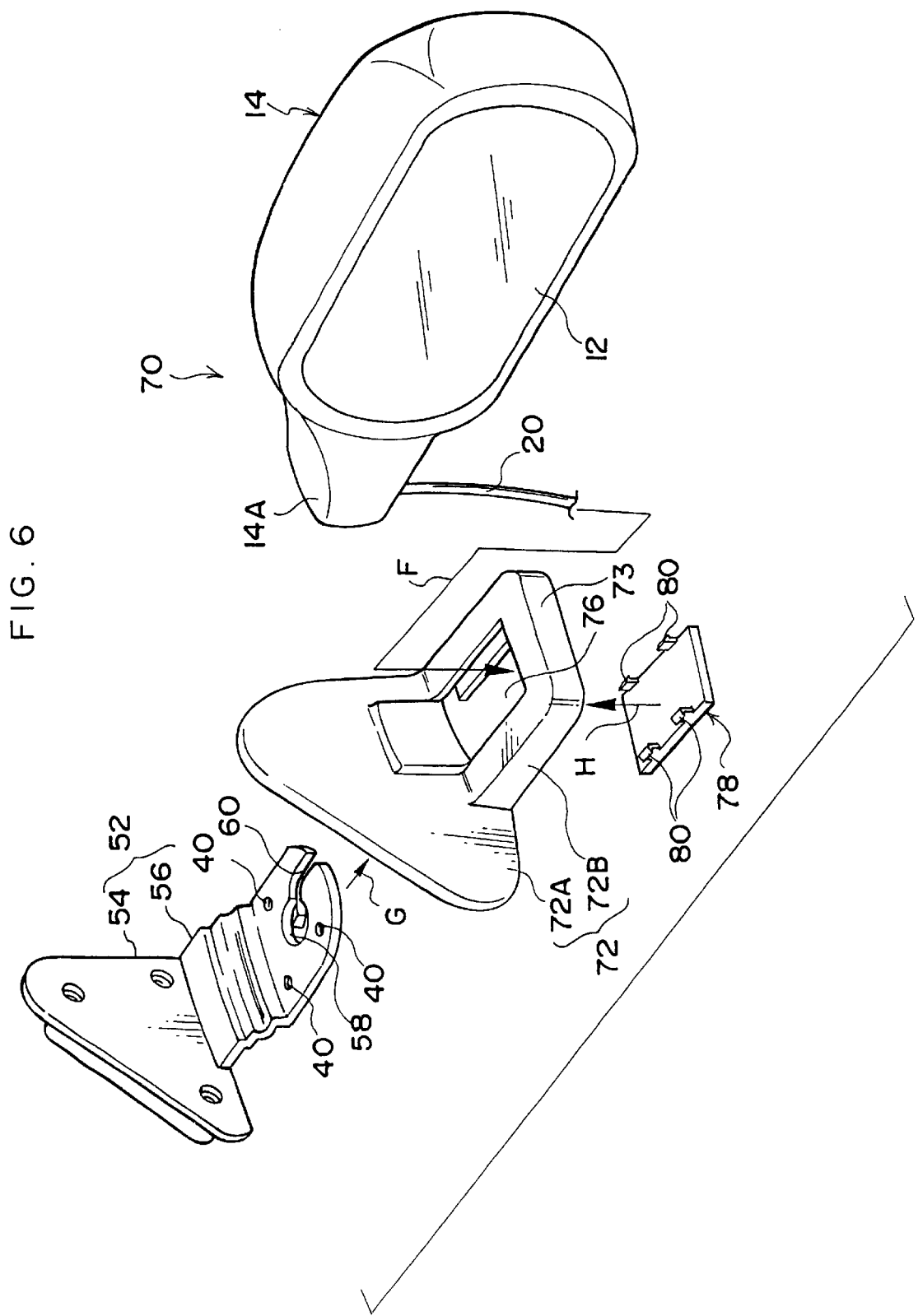
FIG. 6 is an exploded perspective view of a retractable door mirror relating to a third embodiment of the present invention.

In accordance with the above-described structure, first, the cord 20 is inserted into the cut-out 76 of the cover overhanging portion 72B of the first cover 72 with an arrow F direction in FIG. 6 being the assembling direction. Next, the cord 20 is inserted into the slot 60, while the door mirror base 52 is inserted into the cover overhanging portion 72B with an arrow G direction in FIG. 6 being the assembling direction. Or, the door mirror base 52 may first be inserted into the first cover 72, and the cord 20 then inserted into the slot 60. Subsequently, the second cover 78 is mounted into the rectangular-shaped cut-out 76 of the first cover 72 with the arrow H direction in FIG. 6 being the assembling direction.

The structure of the present embodiment follows from the structure of the second embodiment of the present invention. Therefore, operations/effects which are similar to those of the second embodiment can be obtained by the present embodiment. Further, the way of dividing the cover which is to be fitted onto the door mirror base 52 in the present embodiment is different from that in the second embodiment. The, assembling directions of the first cover 72 and the second cover 78 in the present embodiment, therefore, are different from those in the second embodiment. Thus, an embodiment with an optimal assembling direction can be selected in view of assembling efficiency at a door mirror assembly line, and the degrees of freedom in selection are thereby increased.

The straight slot 38 is adopted in the above-described first embodiment, and the crank-shaped slot 60 is adopted in the second embodiment and the third embodiment. However, opposite structures are possible. Namely, the crank-shaped slot 60 may be applied to the structure of the first embodiment, and the straight slot 38 may be applied to the structures of the second embodiment and the third embodiment.

Further, in the above described first through the third embodiments, the opening end portions 38A and 60B of the slots 38 and 60 were both directed toward the vehicle transverse direction outer side. However, according to the present invention, the opening end portion of the slot may be directed in any directions. Instead, according to the present invention, the opening end portion of the slot may be directed in any directions other than toward the vehicle front side.

Further, other than the straight slot 38 and the crank-shaped slot 60, slots having various configurations (for example, a curved shape or the like) are encompassed by in the present invention.

Moreover, in the above-described third embodiment, the rectangular-shaped cut-out 76 is formed at the bottom face side of the first cover 72. However, the present invention is not limited to the same, and a rectangular-shaped opening may be formed. Further, although the second cover 78 is completely separated from the first cover 72 in the third embodiment, the present invention is not limited to the same, and a structure which connects one side edge of the second cover to the bottom face side of the first cover 72 by an integral hinge or the like may be applied.

Figure 7:
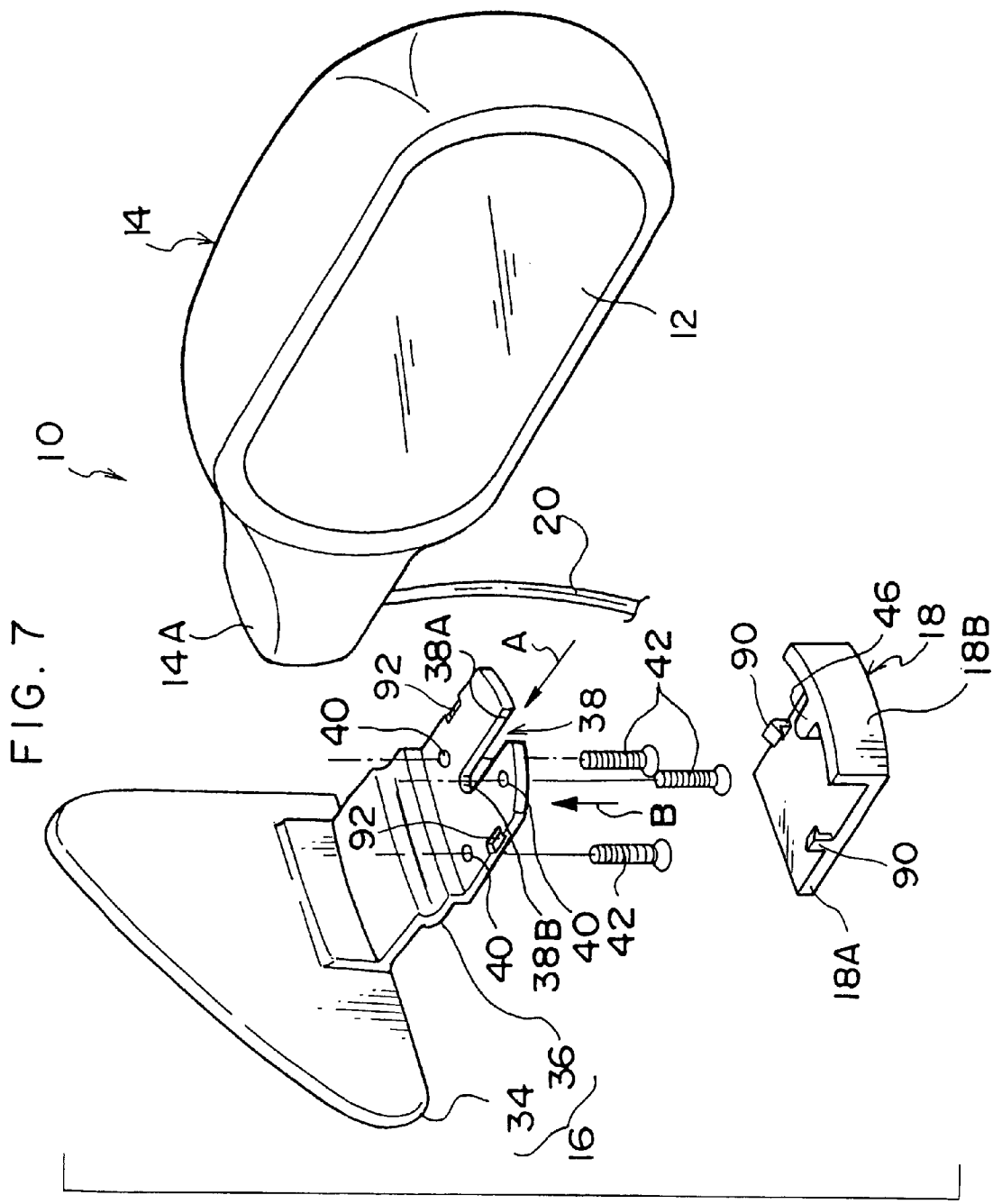
FIG. 7 is an exploded perspective view which illustrates a modified example of the retractable door mirror shown in FIG. 1.
Figure 8:
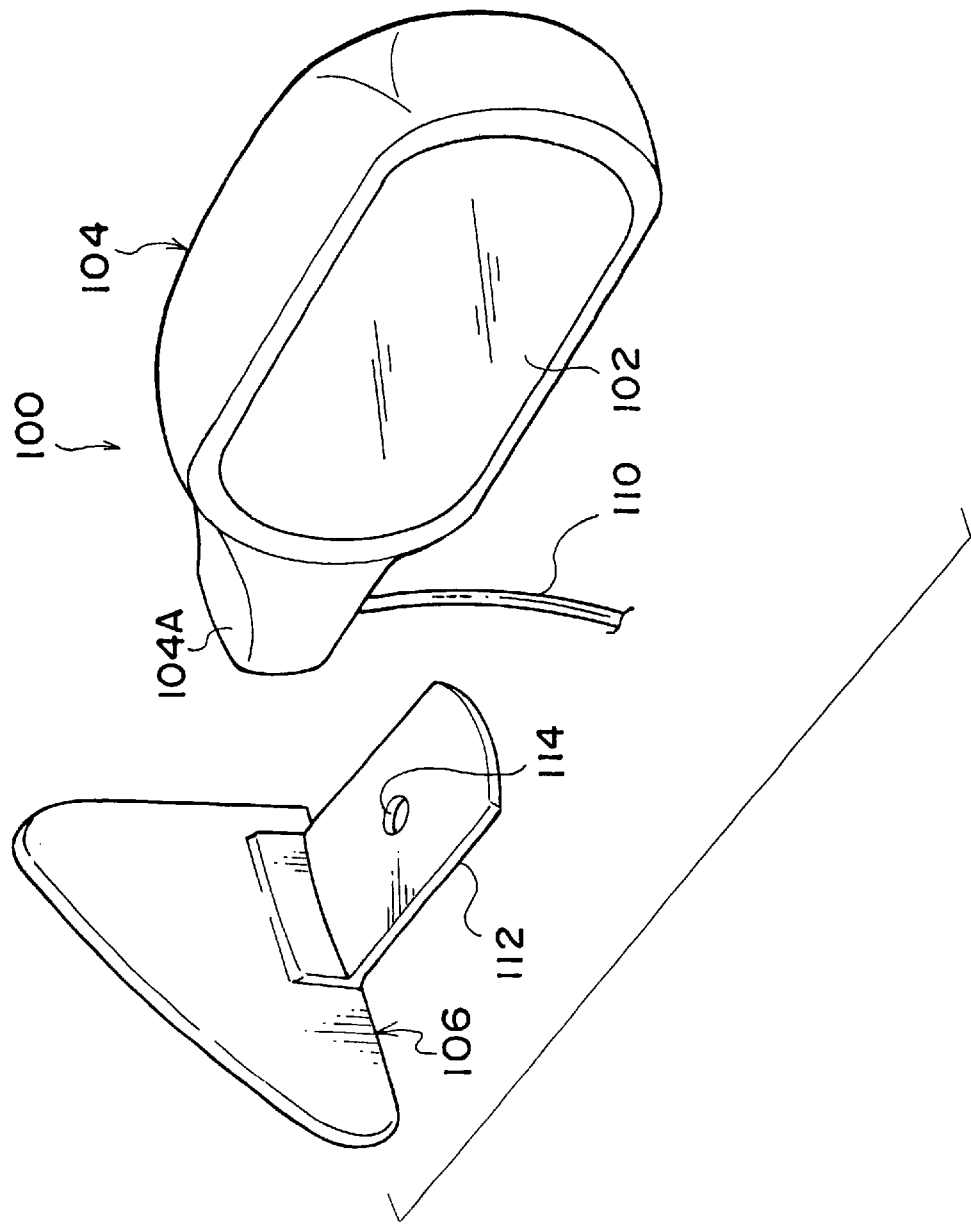
FIG. 8 is an exploded perspective view of a retractable door mirror relating to a conventional example.
Figure 9:
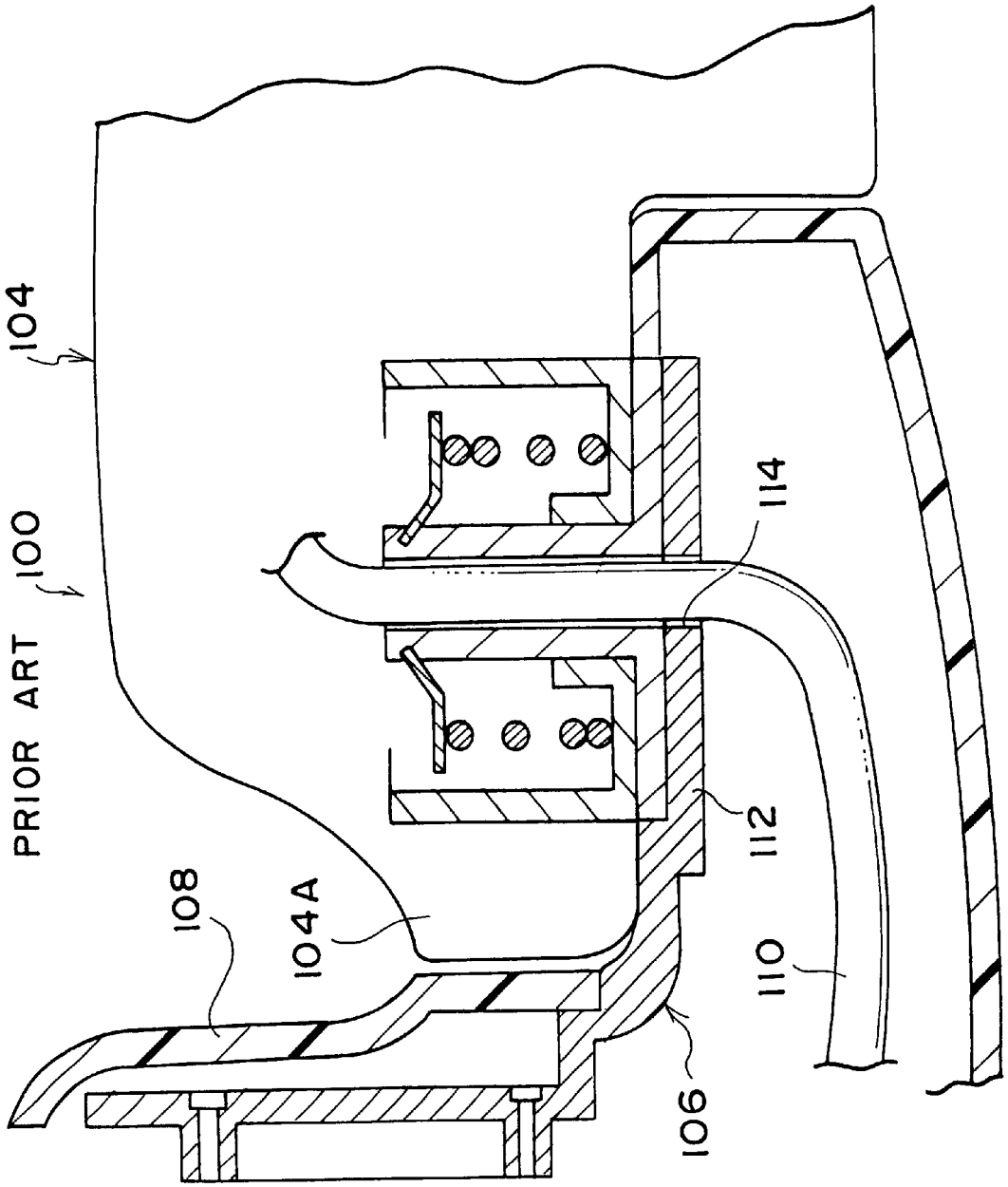
FIG. 9 is a vertical cross-sectional view of the door mirror shown in FIG. 8 in a state in which the door mirror has been assembled.

Further, in the above-described first embodiment, the cover 18 is mounted to the overhanging portion 36 of the door mirror base 16 by the screws 42. However, other than the above-described structure, various assembly structures can be adopted in the first embodiment. For example, in the structure shown in FIG. 7, a pair of elastically deformable engaging claws 90 are formed at opposing sides of the bottom wall portion 18A of the cover 18, and in accordance therewith, a pair of engaging concave portions 92 which can engage with the engaging claws 90 are formed at the overhanging portion 36 of the door mirror base 16. In this case, the base end portion 14A of the door mirror body 14 is first fixed to the overhanging portion 36 of the door mirror base 16 by the screws 42, and thereafter, the cover 18 is elastically engaged with the overhanging portion 36.

What is claimed is:

1. A mirror assembly for a vehicle, comprising:
    a base adapted for mounting to a vehicle body; and
    a mirror body which includes a cable extending from the mirror body, and which is mountable to the base,
    wherein the base includes a plate portion having an elongated slot having a width, length and an open end such that the cable is introduced into the slot through the slot open end, wherein the width of said slot is slightly larger than a diameter of said cable, and the length of said slot is longer than said diameter.

2. The mirror assembly according to claim 1, wherein the slot extends in a substantially straight line.

3. The mirror assembly according claim 1, wherein the slot extends tortuously.

4. The mirror assembly according to claim 1, wherein a direction in which the slot opens is at an angle θ which is substantially 90 degrees or less with respect to a direction in which a mirror surface normally faces toward when the mirror body is in typical use for a vehicle.

5. The mirror assembly according to claim 1, wherein the base includes a plate portion in which the slot is formed.

6. The mirror assembly according to claim 5, wherein the cable passes through the plate portion substantially orthogonal to the plate portion.

7. The mirror assembly according to claim 1, further comprising a connecting section which passes through the base substantially vertically, and the mirror body is pivotable around the connecting section.

8. The mirror assembly according to claim 7, wherein the connecting section includes a substantially cylindrical hollow portion through which the cable is inserted.

9. The mirror assembly according to claim 1, further comprising a cover mountable to the base.

10. The mirror assembly according to claim 9, wherein the cover includes a projection which fits into the slot of the base, closing the open end of the slot when the cover is mounted.

11. The mirror assembly according to claim 9, wherein the cover comprises at least two cover components, which cooperatively form the cover.

12. The mirror assembly according to claim 9, wherein the cover includes a slot through which the cable inserted, and the slot of the cover comprises closed ends.

13. A mirror assembly for a vehicle, comprising:

a base adapted for mounting to a vehicle body; and a mirror body which includes a cable extending from the mirror body, and which is mountable to the base, wherein the base includes a plate portion having an elongated slot having a width, length and an open end such that the cable is introduced into the slot through the slot open end when the mirror body is connected to the base, wherein the width of said slot is slightly larger than a diameter of said cable, and the length of said slot is longer than said diameter.

14. The mirror assembly according to claim 13, wherein the slot is formed such that the cable is translatable from the outside to the inside of the slot through the slot open end.

15. The mirror assembly according to claim 13, further comprising a connecting section which passes through the base substantially vertically, and the cable is inserted through the connecting section, and the mirror body is pivotable around the connecting section.

16. The mirror assembly according to claim 13, further comprising a cover mountable to the base, wherein the cover includes a projection which fits into the slot of the base and closes the slot open end when the cover is mounted.

* * * * *